(12) United States Patent
Youm

(10) Patent No.: US 6,911,801 B2
(45) Date of Patent: Jun. 28, 2005

(54) APPARATUS AND METHOD FOR CONTROLLING INVERTER FOR DRIVING A THREE-PHASE MOTOR

(75) Inventor: Jang-hyoun Youm, Suwon (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 10/756,412

(22) Filed: Jan. 14, 2004

(65) Prior Publication Data

US 2004/0232875 A1 Nov. 25, 2004

(30) Foreign Application Priority Data

May 20, 2003 (KR) ................................ 10-2003-0031968

(51) Int. Cl.⁷ ................................................ H02P 5/34
(52) U.S. Cl. ...................... 318/801; 318/811; 318/599; 318/806; 363/41
(58) Field of Search ................................ 318/800–812, 318/254, 599; 363/41, 45, 132; 323/207

(56) References Cited

U.S. PATENT DOCUMENTS

| | | | | |
|---|---|---|---|---|
| 5,329,222 A | * | 7/1994 | Gyugyi et al. | ............ 323/207 |
| 5,631,819 A | * | 5/1997 | Masaki et al. | ............ 363/132 |
| 5,969,958 A | | 10/1999 | Nielsen et al. | |
| 6,023,136 A | | 2/2000 | Pinewski | |
| 6,201,720 B1 | | 3/2001 | Tracy et al. | |
| 6,313,602 B1 | * | 11/2001 | Arefeen et al. | ............ 318/801 |
| 6,462,974 B1 | | 10/2002 | Jadric | |
| 6,850,863 B2 | * | 2/2005 | Benchaib et al. | ........... 702/151 |
| 2004/0130918 A1 | * | 7/2004 | Ho | ............................ 363/41 |
| 2004/0169488 A1 | * | 9/2004 | Maeda et al. | ............... 318/801 |

FOREIGN PATENT DOCUMENTS

| | | | | |
|---|---|---|---|---|
| EP | 1049241 A2 | * | 11/2000 | ........ H02M/7/5387 |
| KR | 1993-0017286 | | 8/1993 | |
| KR | 10-0219851 | | 6/1995 | |
| KR | 168807 | | 10/1998 | |
| KR | 174490 | | 11/1998 | |
| KR | 2001-0064014 | | 7/2001 | |
| KR | 10-0322256 | | 1/2002 | |
| KR | 10-0390797 | | 6/2003 | |

* cited by examiner

*Primary Examiner*—Paul Ip
(74) *Attorney, Agent, or Firm*—Staas & Halsey LLP

(57) ABSTRACT

An inverter control apparatus and method of a three-phase motor includes disposing three maximum phase voltage vectors each having an equivalent angle interval corresponding to maximum values of each phase voltage; setting maximum phase voltage vector regions by predetermined angles with respect to each of the maximum phase voltage vectors; setting minimum phase voltage vectors corresponding to the maximum phase voltage vectors in between the maximum phase voltage vector regions; obtaining a desirable voltage by turning on a first switch and turning off a second switch, both connected to the phase terminal of a corresponding maximum phase voltage in each maximum phase voltage vector region; and changing a duty ratio of control signals with respect to other two switches corresponding to the other two phase voltages.

16 Claims, 9 Drawing Sheets

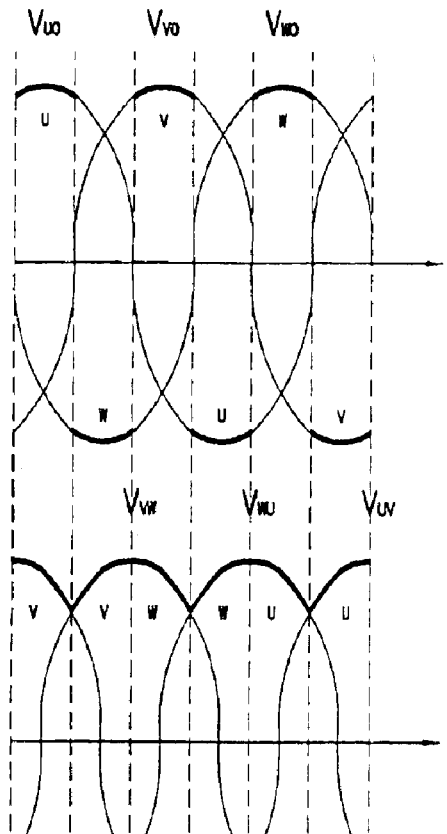
FIG. 7A
FIG. 7B
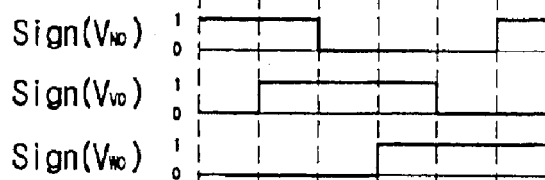
FIG. 7C
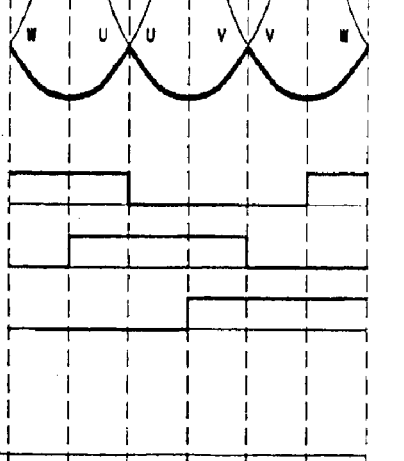
FIG. 7D

APPARATUS AND METHOD FOR CONTROLLING INVERTER FOR DRIVING A THREE-PHASE MOTOR

CROSS-REFERENCE TO RELATED APPLICATIONS

This application claims the benefit of Korean Patent Application No. 2003-31968, filed May 20, 2003, in the Korean Intellectual Property Office, the disclosure of which is incorporated herein by reference.

BACKGROUND OF THE INVENTION

1. Field of the Invention

The present invention relates to a controlling apparatus and method of an inverter to drive a three-phase motor.

2. Description of the Related Art

A three-phase motor with an inverter is commonly used for home appliances, such as an air conditioner, a washer, a refrigerator, and so on, considering energy efficiency. Such inverter mostly uses a PWM method (Pulse Width Modulation), and, especially, a SVM (or SVPWM, Space Voltage Vector Pulse Width Modulation) method. The SVM method is widely known for an ability to maximize an amount of usable DC (Direct Current) voltage connected to the inverter. In addition, the SVM method remarkably reduces current harmonic components at a normal state as compared with a triangular PWM which is widely used in general. See Analysis and Realization of a Pulse Width Modulation on Voltage Space Vector, written by H. W Van der Broeck and H. C Skydelny, IEEE Trans. On Appl., 1998, vol IA-24, no. 1, p. 142–150; and Analysis of the Harmonics in Voltage fed Inverter Devices Caused by PWM Schemes with Discontinuous Switching Operation, written by H. W Van der Broeck, 1991, EPE Conf Rec-3, p.261–266.

However, the conventional SVM has shortcomings of a time-consuming calculation and a complicated realization. An actual switching time is determined based on eight switching conditions of the inverter likely generating under the conventional SVM method. According to such method, two valid switching vectors in a vector space are set nearest to a standard voltage vector, and then each vector is applied within a certain time calculated by an average of each cycle to create an actual switching pattern, and the certain time is used to calculate the actual switching time. That is, after specifying a sector from the location of the standard vector, a vector is selected to be applied and a time for applying is calculated, and then the calculated times are added together.

FIG. 1 through FIG. 3 illustrate a method of inverter control based on the conventional SVM method.

FIG. 1 illustrates an inverter controller having a conventional current controller using a dq-rotating coordinate system.

As shown in FIG. 1, the conventional inverter controller includes an inverter 101, a dq converter 102, a current controller 103, a SVM algorithm module 104, and a gate driver 105.

The inverter 101 has three first switches (Sup, Svp, and Swp) connected between each of phase terminals (u, v, and w) and a positive terminal of a DC (Direct Current) power (Vdc), and three second switches (Sun, Svn, and Swn) connected between each of the phase terminals (u, v, and w), and a negative terminal of the DC power.

FIG. 2 illustrates an allocation of conventional voltage vectors in a space coordinate. The inverter 101 can have eight voltage vectors by means of defining a state of each switch as 1 or 0. The state 1 is set when each of the first switches (Sup, Svp, and Swp) in each of the phases is turned on having the second switches (Sun, Svn, and Swn) turned off. The state 0 is set when each of the first switches in each of the phases is turned off having each of the second switches turned on.

A vector v(t) describes line voltages in the motor as vd and vq, respectively, centering on the d-axis and q-axis of the dq-rotating coordinate system and synchronizing a size (V) of an adjacent voltage vector as a phase angle (θ) to an adjacent voltage vector. Each vector region is a phase-shift space from each of the voltage vectors to the adjacent voltage vector, respectively.

FIG. 3 illustrates a relationship between the vector regions and the phase voltages. A region I starts from where a phase voltage Vuo has a highest value and a region III starts from where a phase voltage Vvo has the highest value.

The d-p converter 102 receives the line voltage flowing from each of the phase terminals to the motor, and sends out the line voltage to the current controller 103 after shifting a coordinate of the received line voltage using the rotating coordinate system. The current controller 103 calculates components of an output voltage in the rotating coordinate system. The SVM algorithm module 104 calculates an output voltage vector and determines a vector holding time of the adjacent vector after setting the adjacent voltage vectors and the corresponding vector regions, and sends out the output voltage vector to the gate driver 105. The gate driver 105 receives the vector holding time and sends out gate signals of six switches in each phase of the inverter 101.

Hereinafter, a calculation of a switch continuity time, namely, a time for a switch-on state to send out a vector v (t) will be described referring to FIG. 2.

To send out the vector v (t), the switch continuity time has to be modulated responding to the size (V) of the vector and the phase angle (θ).

$$V = \sqrt{Vd^2 + Vq^2} \qquad (1)$$

$$\theta = \omega t + \theta dq \qquad (2)$$

$$\left(\text{Herein, } \theta dq = \tan^{-1}\frac{Vq}{Vd}\right)$$

The region to specify the vector adjacent to the output vector for the modulation is calculated as follows.

$$\theta v = \theta - \frac{\Pi}{3}n, \quad \text{for } n = 1, 2, \ldots, 6 \qquad (3)$$

To control currents, the voltage vector can be modulated as follows.

$$v = \frac{T\alpha}{Ts}V\alpha + \frac{T\beta}{Ts}V\beta \qquad (4)$$

With following trigonometric equations, continuity times Tα for the adjacent voltage vectors Vα, Tβ for Vβ, and To for the origin vector Vo can be obtained.

$$T\alpha = \frac{V\sqrt{3}}{V\alpha} T\alpha \sin\left(\frac{II}{3} - \theta_v\right) \quad (5)$$

$$T\beta = \frac{V\sqrt{3}}{\sqrt{\alpha}} T\beta \sin\theta_v \quad (6)$$

$$To = Ts - T\alpha - T\beta \quad (7)$$

However, such conventional technology has complicated algorithms which specifies the vector regions, and calculates the switch continuity times of the adjacent voltage vectors, and sets a pattern per region to calculate the switch continuity times. Also, the gate driver continuously switches the six switches of each phase in the inverter 101.

SUMMARY OF THE INVENTION

Accordingly, it is an aspect of the present invention to provide a controlling apparatus and method of an inverter for a three-phase motor with a simplified hardware and simplified a PWM (Pulse Width Modulation) algorithm of a space voltage vector to prevent system software from being overloaded.

To achieve the above and/or other aspects according to the present invention, there is provided an inverter control method for a three-phase motor including three first switches connected between each of phase terminals of the three-phase motor and a positive terminal of a DC power of the three-phase motor, and three second switches connected between each of the phases and a negative terminal of the DC power of the three-phase motor, including: disposing three maximum phase voltage vectors each having an equivalent angle interval corresponding to maximum values of each phase voltage; setting maximum phase voltage vector regions by predetermined angles with respect to each of the maximum phase voltage vectors; setting minimum phase voltage vectors corresponding to the maximum phase voltage vectors in between the maximum phase voltage vector regions; obtaining a desirable voltage by turning on a first switch and turning off a second switch, both connected to the phase terminal of a corresponding maximum phase voltage in the each maximum phase voltage vector region; and changing a duty ratio of control signals with respect to the other switches corresponding to the other two phase voltages.

According to an aspect of the invention, the inverter control method for a three-phase motor turns on the first switch and turns off the second switch connected to the phase terminal having a maximum phase voltage in the maximum phase voltage vector regions, and has a phase difference of 180 degrees with each of the minimum phase voltage regions; and obtains the desirable voltage by changing the duty ratio of the control signals in the switches corresponding to other two phase voltages.

According to an aspect of the invention, the inverter control method for a three-phase motor, the each phase voltage region is formed by a same angle.

According to an aspect of the invention the inverter control method for a three-phase motor, the duty ratio is calculated based on a ratio of the other two phase voltages and the maximum phase voltage of the maximum phase voltage vector to line voltages between the phase voltages of the phase terminals and voltages of the DC power.

To still achieve the above and/or other aspects according to the present invention, a controlling apparatus of an inverter for a three-phase motor including three first switches connected between each phase terminal of the three-phase motor and a positive terminal of a DC power of the three-phase motor, and three second switches connected between each of the phases and a negative terminal of the DC power, including: a vector region determination part receiving a phase voltage of the each phase terminal as an input and calculating a vector region parameter using a logical calculation using a sign function returning 1 when a received phase voltage has a positive value and returning 0 when the received phase voltage has a negative value, the logical calculation including, region1=sign ($Vuo$) &~sign ($Vvo$) &~sign ($Vwo$)

region2=sign ($Vuo$) &~sign ($Vvo$) &~sign ($Vwo$)

region3=sign ($Vuo$) &~sign ($Vvo$) &~sign ($Vwo$)

region4=sign ($Vuo$) &~sign ($Vvo$) &~sign ($Vwo$)

region5=sign ($Vuo$) &~sign ($Vvo$) &~sign ($Vwo$)

region6=sign ($Vuo$) &~sign ($Vvo$) &~sign ($Vwo$)    (10)

wherein, region1, region2, region3, region4, region5, and region6 are the vector region parameters indicating the phase voltage vector regions, and Vuo, Vvo, and Vwo indicate the phase voltage of a u-phase voltage, a v-phase voltage, and a w-phase voltage of the motor 2, respectively.

The inverter control method for a three-phase motor in the present invention further includes a line voltage comparative generation part receiving the phase voltage as an input and calculating a line voltage comparative signal using a duty ratio calculated based on a ratio of line voltages between each of the phase voltages to the DC power; and an inverter control part calculating first control signals of the first switch of the inverter using a following logical calculation, and generating speed control signals of the second switch having a phase difference in 180 degrees with the first control signal $Su$=region1+$Swu$ & (region2+region5)+$Suv$ & (region3+region6)

$Sv$=region3+$Suv$ & (region1+region4)+$Suw$ & (region2+region5)

$Sw$=region5+$Swu$ & (region3+region6)+$Suv$ & (region1+region4)

Wherein, Su, Sv, and Sw indicate the first control signal, and Suv, Svw, and Swu indicate the line voltage comparative signal, respectively, corresponding to each of the line voltages.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the aspects, taken in conjunction with the accompany drawings of which:

FIGS. 7A through 7D are drawings of a relationship between the phase voltage vector and the phase voltage vector region, according to an aspect of the present invention;

DETAILED DESCRIPTION OF THE PREFERRED EMBODIMENTS

Figure 1:
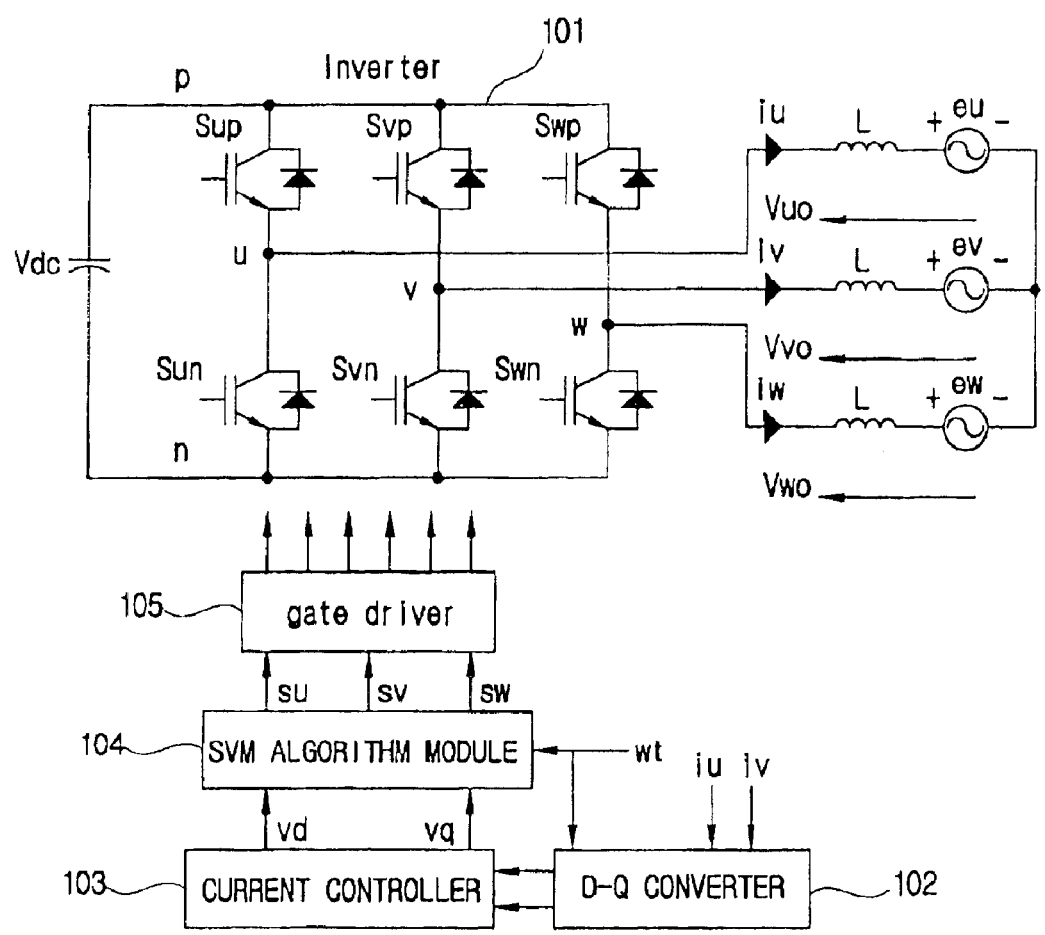
FIG. 1 is a block diagram of a conventional current controller using a d-q rotating coordinate system.
Figure 2:
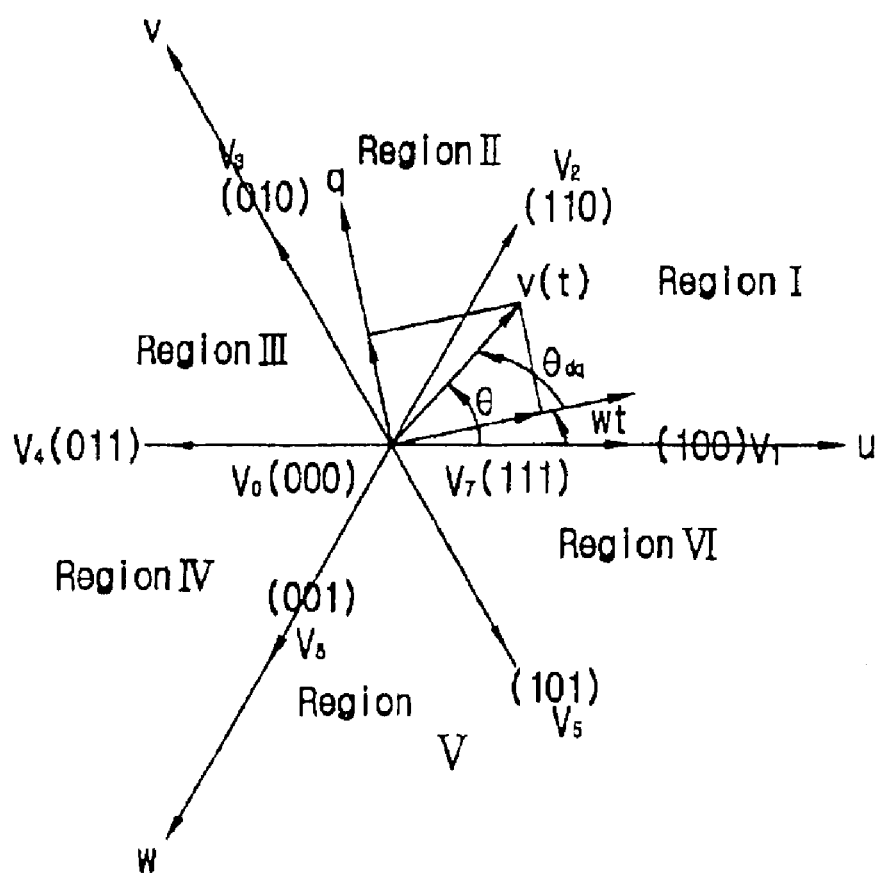
FIG. 2 is a space coordinate plot plan of a conventional voltage vector.
Figure 3:
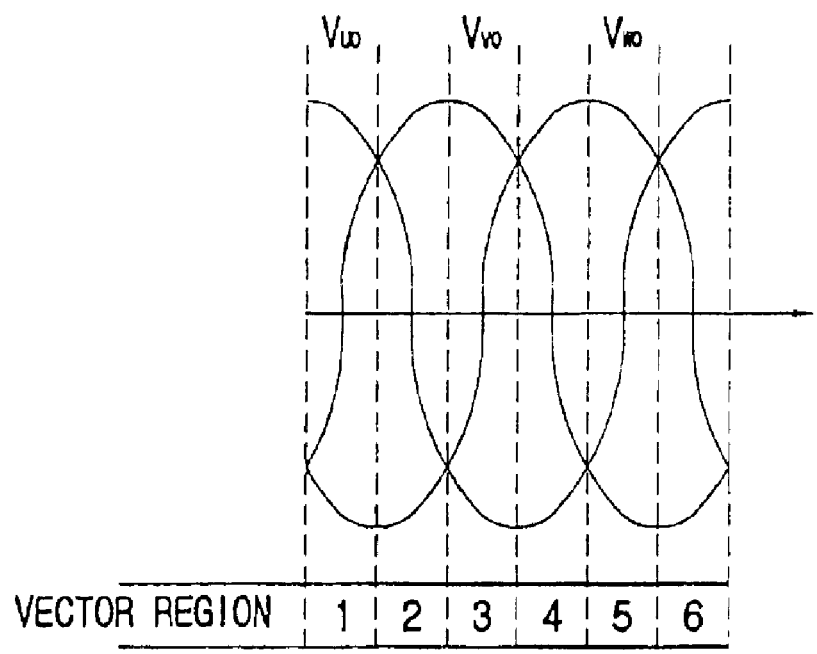
FIG. 3 is a drawing of relationship between a conventional vector region and a phase voltage.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 4:
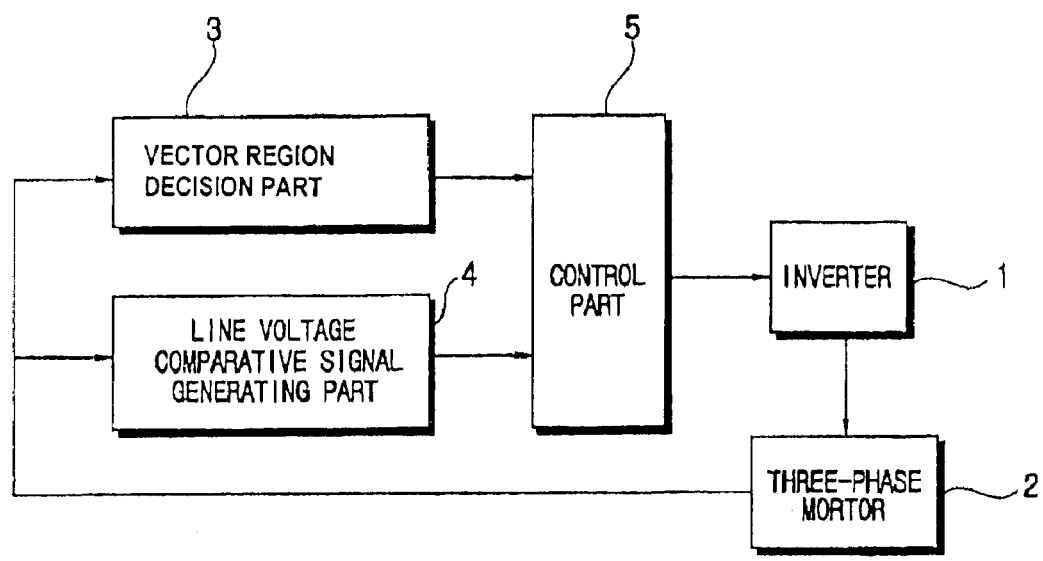
FIG. 4 is a block diagram of a controlling apparatus of an inverter for a three-phase motor, according to an aspect of the present invention.

As shown in FIG. 4, a controlling apparatus of an inverter includes an inverter 1, a three-phase motor 2, a vector region decision part 3, a line voltage comparative signal generating part 4, and an inverter control part 5.

Figure 5:
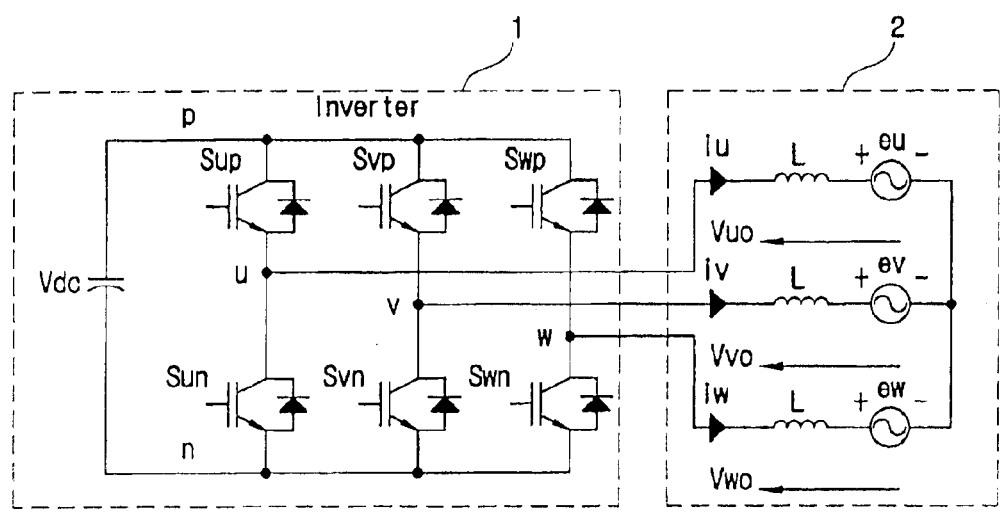
FIG. 5 is a circuit diagram of the inverter and the three-phase motor, according to an aspect of the present invention.

Referring FIG. 5, the inverter 1 has three first switches (Sup, Svp, and Swp) and three second switches (Sun, Svn, and Swn). The first switch is connected between each of phase terminals (u-phase, v-phase, and w-phase) of the three-phase motor 2 and a positive terminal of a DC power, and the second switch is connected between each of the phase terminals (u-phase, v-phase, and w-phase) of the three-phase motor 2 and a negative terminal of the DC power. An output terminal of the inverter 1 is connected to each phase terminal of the three-phase motor 2 in a three phase balance. Voltages of each phase terminal become a phase voltage (Vuo, Vvo, and Vwo) relative to a neutral point (0) of the three-phase motor 2.

The region decision part 3 receives the phase voltage of each phase terminal of the three-phase motor 2 as an input and sends a vector region variable to the inverter control part 5 as an output.

Hereafter, a phase voltage vector and a phase voltage vector region on a space coordinate according to aspects of the present invention will be described referring FIG. 6 and FIGS. 7A through 7D.

Control signals (Su, Sv, and Sw) are each input through gate terminals of the first switch and the second switch of each phase of the inverter 1 and the control signals control the switch on and off. The phase voltage vector has a value of 1 by turning on the first switch and turning off the second switch, and a value of 0 by turning off the first switch and turning on the second switch; thus, the inverter 1 having six switches can have eight phase voltage vectors (V0~V7).

Figure 6:
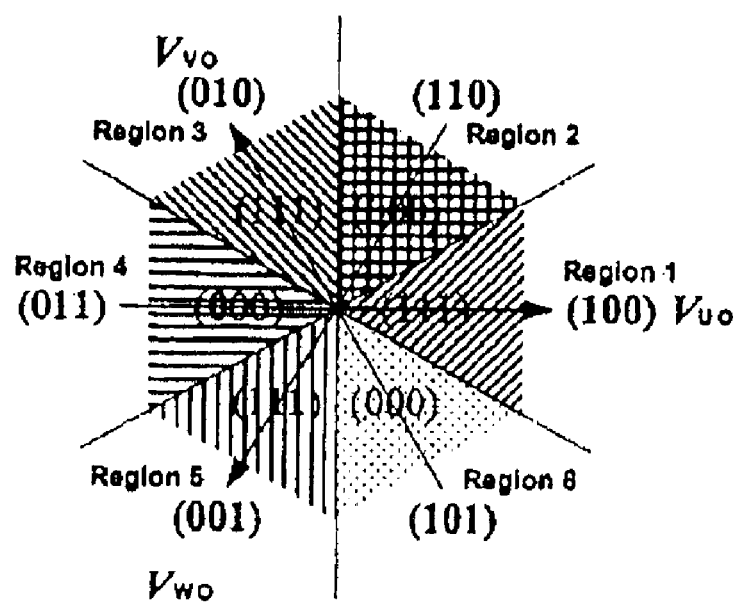
FIG. 6 is a plot plan of a phase voltage vector and a phase voltage vector region, according to an aspect of the present invention.

FIG. 6 illustrates the phase voltage vector and the phase vector region thereof. The phase voltage vector regards V0 (0,0,0) and V7 (1,1,1) as reference voltage vectors. Excluding the reference voltage vectors, V0 (0,0,0) and V7 (1,1,1), V1 (1,0,0), V2 (1,1,0), V3 (0,1,0), V4 (0,1,1), V5 (0,0,1) and V6 (1,0,1) are orderly disposed every 60 degrees. The reference voltage vector having a maximum distance with each of the phase voltage vectors becomes a origin vector of the voltage vector regions, respectively.

The V1 is a vector when the Vuo has a maximum value. The V4 has an opposite phase to the V1 and is a vector when the phase voltage Vuo has a minimum value. In the same way, the V3 and the V5 represent the maximum values of the phase voltage Vvo and Vwo, respectively, and the V6 and the V2 are minimum values, respectively. Therefore, the vectors V1, V3, and V5 are specified as maximum phase voltage vectors and the vectors V2, V4, and V6 are specified as minimum phase voltage vectors, hereinafter.

As shown in FIG. 6, each phase voltage vector region has a predetermined angle with respect to each of the phase voltage vectors, where the angle may be 60 degrees. FIGS. 7A and 7B illustrate the relationship between the phase voltage vector region and the phase voltage vector. Waveforms of the Vuo and the Vvo draw the maximum values in a middle of the phase voltage vector region 1 and 3, respectively. At this point, FIG. 7C illustrates each region as being related to a sign of the corresponding phase voltage.

Thus, a vector region parameter can be computed by using a logical calculation of a sign function which returns 1, if the phase voltage has a positive value, and 0, if the phase voltage has a negative value. The logical calculation of sign function is expressed by the flowing formula (10):

$$\begin{aligned}&\text{region1}=\text{sign }(Vuo)\ \&\sim\text{sign }(Vvo)\ \&\sim\text{sign }(Vvo)\\&\text{region2}=\text{sign }(Vuo)\ \&\ \text{sign }(Vvo)\ \&\sim\text{sign }(Vvo)\\&\text{region3}=\sim\text{sign }(Vuo)\ \&\ \text{sign }(Vvo)\ \&\sim\text{sign }(Vvo)\\&\text{region4}=\sim\text{sign }(Vuo)\ \&\ \text{sign }(Vvo)\ \&\ \text{sign }(Vwo)\\&\text{region5}=\sim\text{sign }(Vuo)\ \&\sim\text{sign }(Vvo)\ \&\ \text{sign }(Vvo)\\&\text{region6}=\text{sign }(Vuo)\ \&\sim\text{sign }(Vvo)\ \&\ \text{sign }(Vvo)\end{aligned} \quad (10)$$

Region1, region2, region3, region4, and region5 are the vector region parameters indicating the phase voltage vector region, and the Vuo, the Vvo, and the Vwo indicate the u-phase voltage, the v-phase voltage, and the w-phase voltage, respectively, of the motor 2.

Accordingly, the phase voltage vectors are placed in the region where the vector region parameter is pointing when the vector region parameter is 1.

The line voltage comparative signal generating part 4 receives the phase voltages and sends the line voltage comparative signals to the inverter control part 5. The line voltage comparative signals vary depending on a duty ratio which is calculated by a ratio of the line voltage between the each of the phase voltages to the DC power connected to the inverter 1. Hereinafter, the calculation process of continuity time and comparative signals of the line voltage will be described.

A relational expression between the continuity times of each phase (Tu, Tv, and Tw) and average output voltages (Vun, Vvn, and Vwn) on a basis of a negative terminal (n) of the DC power, is as shown in formula (11):

$$Vun = Vdc\frac{Tu}{Ts} \quad Vvn = Vdc\frac{Tv}{Ts} \quad Vwn = Vdc\frac{Tw}{Ts} \quad (11)$$

A principle of superposition is applied to calculate a voltage Von based on the negative terminal of the DC power in the neutral point (0) of the three-phase circuits is shown in formula (12):

$$Von = \frac{1}{3}(Vun + Vvn + Vwn) = \frac{1}{3}\frac{Vdc}{Ts}(Tu + Tv + Tw) \qquad (12)$$

A relationship between an output phase voltage and the continuity time of the switch is as shown in formula (13):

$$\begin{bmatrix} Vuo \\ Vvo \\ Vwo \end{bmatrix} = \begin{bmatrix} Vun \\ Vvn \\ Vwn \end{bmatrix} - \begin{bmatrix} Von \\ Von \\ Von \end{bmatrix} = \frac{1}{3}\frac{Vdc}{Ts}\begin{bmatrix} 2 & -1 & -1 \\ -1 & 2 & -1 \\ -1 & -1 & 2 \end{bmatrix}\begin{bmatrix} Tu \\ Tv \\ Tw \end{bmatrix} \qquad (13)$$

When the phase voltage vectors are placed on the phase voltage vectors region 1 having V7 (1,1,1) as the origin vector, the Tu equals Ts and the calculation of the continuity times of the each phase using the formula 13 is as shown in formula (14):

$$\begin{bmatrix} Tu \\ Tv \\ Tw \end{bmatrix} = \begin{bmatrix} Ts \\ Ts \\ Ts \end{bmatrix} - \frac{Ts}{Vdc}\begin{bmatrix} Vuo - Vuo \\ Vvo - Vuo \\ Vwo - Vuo \end{bmatrix} = \begin{bmatrix} Ts \\ Ts \\ Ts \end{bmatrix} - \frac{Ts}{Vdc}\begin{bmatrix} 0 \\ Vvu \\ Vwu \end{bmatrix} \qquad (14)$$

When the phase voltage vectors are placed on the phase voltage vectors region 1 having V0 (0,0,0) as the origin vector, the Tw equals zero (0) and the calculation of the continuity times of the each phase using the formula (13) is as follows:

$$\begin{bmatrix} Tu \\ Tv \\ Tw \end{bmatrix} = \frac{Ts}{Vdc}\begin{bmatrix} Vuo - Vwo \\ Vvo - Vwo \\ Vwo - Vwo \end{bmatrix} = \frac{Ts}{Vdc}\begin{bmatrix} Vuw \\ Vvw \\ 0 \end{bmatrix} \qquad (15)$$

Tu, Tv, and Tw indicate pulse times of the duty cycle, which the first switch of each phase is an on-state. Vuo, Vvo, and Vwo are the phase voltage respectively corresponding to the u-phase, v-phase, and w-phase, respectively. Ts is a pulse interval in the duty cycle of the control signal applied to the first switch.

Formulas (14) and (15) show that a continuity time of the switches in each phase is determined by a size of the origin voltage vector and the line voltage per region. Thus, the control signal turning on the first switch responding to the calculated continuity time using the above formulas is named as a line voltage comparative signal.

Figure 8:
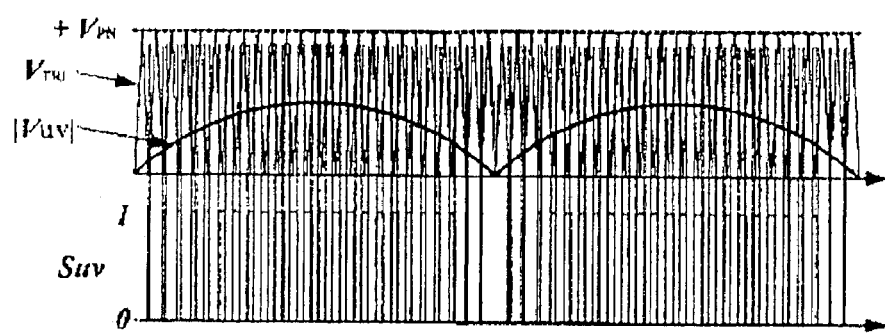
FIG. 8 is a line voltage comparative signal diagram relative to an output line voltage in a triangular waveform when an origin vector has a value of (1,1,1), according to an aspect of the present invention.
Figure 9A:
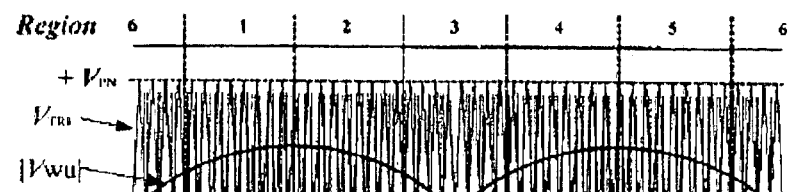
FIGS. 9A through 9I are control signal diagrams of a line voltage comparative signal corresponding to a phase voltage vector region, and first switches in each phase, according to an aspect of the present invention.
Figure 9B:
Figure 9C:
Figure 9D:
Figure 9E:
Figure 9F:
Figure 9G:
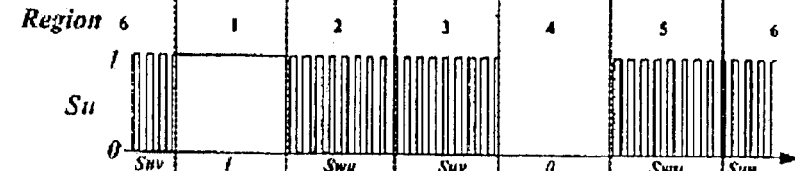
Figure 9H:
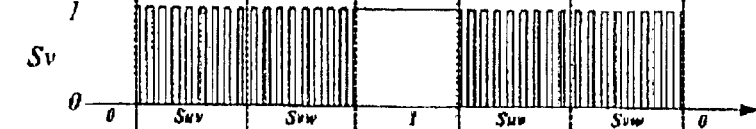
Figure 9I:
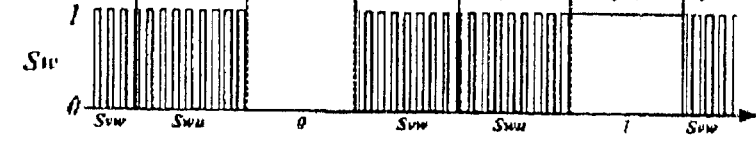

FIG. 8 illustrates the line voltage comparative signals and the output line voltages when the origin vector is V7 (1,1,1) in a triangular waveform. If the origin vector is V0 (0,0,0), the phase of the line voltage comparative signals have to be reversed, that is, a 180 degree phase change.

The inverter control part 5 receives the vector region parameter and the line voltage comparative signal from the vector region determination part 3 and the line voltage comparative signal generating part 4, respectively, and outputs the inverter control signal to the inverter 1.

As shown in FIG. 7D, the control signals corresponding to each of the switches in the inverter 1 are changed as the line voltage is changed by a time shift and switching of the four switches in each of the phase voltage vector regions. However, the switch connected to the phase terminal of origin vector stays in predetermined on/off states. Therefore, the control signals of the first switch connected to each of the phase terminals is calculated by flowing logical calculation of formula (16):

$Su$=region1+$Swu$ & (region2+region5)+$Suv$ & (region3+region6)

$Sv$=region3+$Suv$ & (region1+region4)+$Suw$ & (region2+region5)

$Sw$=region5+$Swu$ & (region3+region6)+$Suv$ & (region1+region4) (16)

Su, Sv, and Sw indicate the first switch control signal. Suv, Svw, and Swu indicate the line voltage comparative signal corresponding to each of the line voltages. Region1, region2, region3, region4, region5, and region6 are the vector region parameters.

FIGS. 9A through 9I illustrate the line voltage comparative signals (9B Swb, 9D Svw, 9F Suv) corresponding to each of the line voltage vector regions and the control signals (9G Su, 9H Sv, 9I Sw) of the first switch of each phase.

The control signals applied to the second switches of the each phase have a phase difference of 180 degrees with respect to the control signals of the first switches.

With this configuration, the present invention provides a controlling apparatus and method of an inverter for a three-phase motor with a simplified logical calculation, and each of phase voltage vectors has one set of switches in fixed values to prevent a switching system from being overused.

Although a few embodiments of the present invention have been shown and described, it will be appreciated by those skilled in the art that changes may be made in these aspects without departing from the principles and spirit of the invention, the scope of which is defined in the appended claims and their equivalents.

What is claimed is:

1. An inverter control method for a three-phase motor comprising three first switches connected between each of phase terminals of the three-phase motor and a positive terminal of a DC power of the three-phase motor, and three second switches connected between each of the phases and a negative terminal of the DC power of the three-phase motor, comprising:

disposing three maximum phase voltage vectors each having an equivalent angle interval corresponding to maximum values of each phase voltage;

setting maximum phase voltage vector regions by predetermined angles with respect to each of the maximum phase voltage vectors;

setting minimum phase voltage vectors corresponding to the maximum phase voltage vectors in between the maximum phase voltage vector regions;

obtaining a desirable voltage by turning on a first switch and turning off a second switch, both connected to the phase terminal of a corresponding maximum phase voltage in each maximum phase voltage vector region; and changing a duty ratio of control signals with respect to the other switches corresponding to the other two phase voltages.

2. The inverter control method for a three-phase motor according to claim 1, further comprising:

turning on the first switch and turning off the second switch connected to the phase terminal having a maximum phase voltage in the maximum phase voltage vector regions, and having a phase difference in 180 degrees with each of the minimum phase voltage regions; and obtaining the desirable voltage by changing the duty ratio of the control signals in the switches corresponding to other two phase voltages.

3. The inverter control method for a three-phase motor according to claim 1, wherein the each phase voltage region is formed by a same angle.

4. The inverter control method for a three-phase motor according to claim 2, wherein the each phase voltage vector region is formed by a same angle.

5. The inverter control method for a three-phase motor according to claim 1, wherein the duty ratio is calculated based on a ratio of the other two phase voltages and the maximum phase voltage of the maximum phase voltage vector to line voltages between the phase voltages of the phase terminals and voltages of the DC power.

6. The inverter control method for a three-phase motor according to claim 2, wherein the duty ratio is calculated based on a ratio of the other two phase voltages and the maximum phase voltage of the maximum phase voltage vector to line voltages between the phase voltages of the phase terminals and voltages of the DC power.

7. The inverter control method for a three-phase motor according to claim 1, further comprising:
connecting an output terminal of the inverter to each phase terminal of the three-phase motor in a three phase balance.

8. The inverter control method for a three-phase motor according to claim 1, wherein voltages of each phase terminal becomes a phase voltage (Vuo, Vvo, and Vwo) relative to a neutral point (0) of the three-phase motor.

9. The inverter control method for a three-phase motor according to claim 1, wherein the control signals are each input through gate terminals of the first switch and the second switch of each phase of the inverter and the control signals control a switch on and a switch off.

10. The inverter control method for a three-phase motor according to claim 1, wherein each phase voltage vector has a value of 1 by turning on the first switch and turning off the second switch, and a value of 0 by turning off the first switch and turning on the second switch, so that the inverter having six switches has eight phase voltage vectors (V0~V7).

11. The inverter control method for a three-phase motor according to claim 1, wherein a relation between continuity times of each phase (Tu, Tv, and Tw) and average output voltages (Vun, Vvn, and Vwn) on a basis of a negative terminal (n) of the DC power, is as follows:

$$Vun = Vdc \frac{Tu}{Ts} \quad Vvn = Vdc \frac{Tv}{Ts} \quad Vwn = Vdc \frac{Tw}{Ts}$$

where Ts is a pulse interval in a duty cycle of the control signal applied to the first switch.

12. The inverter control method for a three-phase motor according to claim 1, further comprising:
calculating a voltage Von on a basis of the negative terminal of the DC power in the neutral point (0) of the three-phase circuits:

$$Von = \frac{1}{3}(Vun + Vvn + Vwn) = \frac{1}{3}\frac{Vdc}{Ts}(Tu + Tv + Tw).$$

13. The inverter control method for a three-phase motor according to claim 1, wherein a relationship between an output phase voltage and a continuity time of the switch is as follows:

$$\begin{bmatrix} Vuo \\ Vvo \\ Vwo \end{bmatrix} = \begin{bmatrix} Vun \\ Vvn \\ Vwn \end{bmatrix} - \begin{bmatrix} Von \\ Von \\ Von \end{bmatrix} = \frac{1}{3}\frac{Vdc}{Ts}\begin{bmatrix} 2 & -1 & -1 \\ -1 & 2 & -1 \\ -1 & -1 & 2 \end{bmatrix}\begin{bmatrix} Tu \\ Tv \\ Tw \end{bmatrix}.$$

14. The inverter control method for a three-phase motor according to claim 1, wherein when phase voltage vectors are placed on the phase voltage vectors region having (1,1,1) as the origin vector, the Tu equals Ts and a calculation of continuity times of the each phase comprises:

$$\begin{bmatrix} Tu \\ Tv \\ Tw \end{bmatrix} = \begin{bmatrix} Ts \\ Ts \\ Ts \end{bmatrix} - \frac{Ts}{Vdc}\begin{bmatrix} Vuo - Vuo \\ Vvo - Vuo \\ Vwo - Vuo \end{bmatrix} = \begin{bmatrix} Ts \\ Ts \\ Ts \end{bmatrix} - \frac{Ts}{Vdc}\begin{bmatrix} 0 \\ Vvu \\ Vwu \end{bmatrix}.$$

15. The inverter control method for a three-phase motor according to claim 1, wherein when the phase voltage vectors are placed on the phase voltage vectors region having (0,0,0) as the origin vector, the Tw equals zero (0) and a calculation of continuity times of the each phase comprises:

$$\begin{bmatrix} Tu \\ Tv \\ Tw \end{bmatrix} = \frac{Ts}{Vdc}\begin{bmatrix} Vuo - Vwo \\ Vvo - Vwo \\ Vwo - Vwo \end{bmatrix} = \frac{Ts}{Vdc}\begin{bmatrix} Vuw \\ Vvw \\ 0 \end{bmatrix}.$$

where Tu, Tv, and Tw indicate pulse times of the duty cycle, which the first switch of each phase is an on-state, Vuo, Vvo, and Vwo are the phase voltage respectively corresponding to each of the phase terminals (u-phase, v-phase, and w-phase), respectively.

16. A controlling apparatus of an inverter for a three-phase motor comprising three first switches connected between each phase terminal of the three-phase motor and a positive terminal of a DC power of the three-phase motor, and three second switches connected between each of the phases and a negative terminal of the DC power, comprising:

a vector region determination part receiving a phase voltage of the each phase terminal as an input and calculating a vector region parameter using a logical calculation using a sign function returning 1 when a received phase voltage has a positive value and returning 0 when the received phase voltage has a negative value, the logical calculation comprising:

region1=sign (Vuo)&~sign (Vvo)&~sign (Vwo)

region2=sign (Vuo)& sign (Vvo)&~sign (Vwo)

region3=~sign (Vuo)& sign (Vvo)&~sign (Vwo)

region4=~sign (Vuo)& sign (Vvo)& sign (Vwo)

region5=~sign (Vuo)&~sign (Vvo)& sign (Vwo)

region6=sign (Vuo)&~sign (Vvo)& sign (Vwo)

wherein, region1, region2, region3, region4, region5, and region6 are the vector region parameters indicating the phase voltage vector regions, and Vuo, Vvo, and Vwo indicate the phase voltage of a u-phase voltage, a v-phase voltage, and a w-phase voltage of the motor, respectively;

a line voltage comparative generation part receiving the phase voltage as an input and calculating a line voltage comparative signal using a duty ratio calculated based on a ratio of line voltages between each of the phase voltages to the DC power; and an inverter control part calculating first control signals of the first switch of the inverter using a following logical calculation, and generating speed control signals of the second switch having a phase difference in 180 degrees with the first control signal $Su$=region1+$Swu$&(region2+region5)+$Suv$&(region3+region6)
$Sv$=region3+$Suv$&(region1+region4)+$Suw$&(region2+region5)
$Sw$=region5+$Swu$&(region3+region6)+$Suv$&(region1+region4)

wherein, Su, Sv, and Sw indicate the first control signal, and Suv, Svw, and Swu indicate the line voltage comparative signal, respectively, corresponding to each of the line voltages.

* * * * *

UNITED STATES PATENT AND TRADEMARK OFFICE
CERTIFICATE OF CORRECTION

PATENT NO. : 6,911,801 B2
DATED : June 28, 2005
INVENTOR(S) : Jang-hyoun Youm

It is certified that error appears in the above-identified patent and that said Letters Patent is hereby corrected as shown below:

Title page,
Item [56], References Cited, FOREIGN PATENT DOCUMENTS, change "6/1995" to -- 6/1999 --.

Signed and Sealed this

Twenty-first Day of March, 2006

JON W. DUDAS
*Director of the United States Patent and Trademark Office*